United States Patent [19]

Brandkamp et al.

[11] Patent Number: 5,029,311
[45] Date of Patent: Jul. 2, 1991

[54] STABILIZED FLUORESCENT LAMP FOR A DOCUMENT SCANNING SYSTEM

[75] Inventors: Warren F. Brandkamp, Webster; Frederick B. Clark, W. Henrietta; Carl Hardaway, Sodus, all of N.Y.

[73] Assignee: Xerox Corporation, Stamford, Conn.

[21] Appl. No.: 590,428

[22] Filed: Sep. 28, 1990

[51] Int. Cl.⁵ .................... G03B 27/52; G03B 27/72
[52] U.S. Cl. ........................................ 355/30; 355/69
[58] Field of Search ............... 355/30, 62, 69, 229; 313/13, 15, 44

[56] References Cited

U.S. PATENT DOCUMENTS 4,751,551 6/1988 Beiter et al. ...................... 355/30
4,827,313 5/1989 Corona ............................... 355/30

FOREIGN PATENT DOCUMENTS 59-42534 9/1984 Japan .

Primary Examiner—L. T. Hix
Assistant Examiner—D. Rutledge

[57] ABSTRACT

A fluorescent lamp utilized in a document scanning system is environmentally and thermally stabilized by means of a bifurcated heater control assembly. A heater blanket is wrapped around the entire surface of the lamp including the end areas surrounding the filaments but exclusive of the aperture through which light is emitted. The size and temperature of the lamp cold spot are selected empirically to maximize output power and minimize illumination transients during power on. The heater jacket has thermostat control set points, which, in both the lamp standby and energized states, maintain the blanket and lamp assembly at a constant elevated temperature which is above that achieved by lamp heat alone. Since the temperature distribution is always determined by the blanket and never by the lamp, changes in temperature or temperature distribution (and hence illumination distribution) as the lamp transitions from standby to full on are minimized.

17 Claims, 8 Drawing Sheets

STABILIZED FLUORESCENT LAMP FOR A DOCUMENT SCANNING SYSTEM

BACKGROUND AND MATERIAL INFORMATION DISCLOSURE

This invention relates to an illumination system for a document scanning system and, more particularly to a fluorescent lamp and heating assembly which is thermally stabilized to emit an output in which temporal variations in axial light output along its length are minimized.

Low pressure, mercury vapor fluorescent lamps are used in a variety of lighting applications. Of particular interest, for purposes of the present invention, is the widespread use of fluorescent lamps to illuminate documents being copied by an electrophotographic reproduction machine.

In a conventional mercury fluorescent lamp, an electrical discharge is generated in a mixture of mercury vapor, at low pressure, and a fill gas typically argon, neon, Krypton, xenon or mixtures thereof.

The temporal stability of the axial light output from the lamp, referred to as the lamp illumination profile, depends on a number of variables, the most important of which is the mercury vapor pressure within the lamp. The internal aggregate mercury vapor pressure is controlled by the coldest spot in the lamp referred to as the cold spot. Spatial illumination changes occur as mercury responds to localized temperature changes by moving back and forth between the cold spot and the internal walls of the lamp. In addition to the cold spot temperature, there are other operating conditions which cause a fluorescent lamp to exhibit a large and unpredictable temporal and spatial variability in its illumination output profile. Factors contributing to the instability directly or indirectly influence mercury pressure stability and are caused by: temporal variations in the cold spot temperatures, changes in the mercury/phosphor attachment along the internal walls of the lamp envelope during periods when only the filaments are energized, such periods being known as standby periods; and changes in operating mode when changing from a standby period to full energization. These factors become more significant when the lamp is operated at high power loadings where the lamp temperature change between standby and run is large. When the lamp is used in a document copying application, where a uniform band of illumination is required to scan a document to be reproduced, non-uniform light output from the temporal variations in light output along the length of the lamp results, ultimately, in defects in the output copies produced following the xerographic steps of exposure, development, transfer and fusing.

Fluorescent lamp instability is especially acute in applications which require the use of Extra High Output (EHO) lamps to produce a high output illumination level. For purpose of this invention such lamps are defined as lamps drawing approximately two amps of current. Lamps in this range find typical application in high throughput raster input scan (RIS) systems where the lamp is used to illuminate a document on a platen and the reflected line images are captured electronically at an image plane comprising a linear array of photoreceptors, such as charge-coupled diodes (CCD). The invention, however, is not limited only to EHO lamps used in electronic scanning applications, but will also find utility in conventional light lens copiers which require a fluorescent lamp as the illuminator.

It is known in the art to stabilize the operation of fluorescent lamps by wrapping a heating jacket around the lamp and maintaining the jacket at a desired temperature above that of the cold spot. U.S. Pat. No. 4,751,551 discloses a typical lamp assembly having heater jacket 8 wrapped around most of its length. It is also known in the art to use a segmented jacket with independently powered sections to produce temperature gradients along the entire length as, for example, in U.S. Pat. No. 4,827,313, and Japanese Publication 59-42534. These prior art lamp/jacket assemblies while providing some compensation for lamp profile variations may not prove effective and for all systems for all environmental and temperature conditions. A recurring difficulty when using fluorescent lamps is the problem of illumination changes when changing between the standby and full-on active states. Following a normal operation, and a return to standby, the mercury in the lamp tends to stick to the interior walls of the lamp rather than return to the desired cold spot location. The greater the difference between the operating temperature profile and the lower standby temperature profile, the greater is the tendency for the mercury concentration at the envelope walls and in the discharge area of the lamp envelope to change. These changes correlate directly with the deleterious time-varying changes in the illumination output of the lamp. While in the prior art, heat is supplied by a heater blanket to maintain the lamp above the temperature of the cold spot in standby, there is no provision to insure that the heater blanket does not turn off when the lamp is fully powered up since in the power-on mode, the lamp typically runs much hotter than in standby. This is especially true for high power lamps. In such cases the temperature exceeds the blanket temperature control point and electrical energy to the blanket is shut off. This produces a significant difference in the temperature profile along the lamp wall between the standby and run operating states. In standby mode, the profile and upper temperature is defined by the blanket; in the run mode by the lamp. There is a time varying temperature change during critical periods when changing between the standby and power-on states. The resulting changes in lamp wall temperature causes changes in localized mercury vapor pressure and a corresponding change in localized illumination.

It is, therefore, desirable to provide a fluorescent lamp with a heater blanket which maintains the same constant lamp temperature profile during both the lamp operational cycle and also during standby. It is equally desirable to control the temperature to the extreme ends of the lamp including the areas adjacent to the filaments.

According to a first aspect of the present invention, an apertured fluorescent lamp is wrapped from one end to the other with a heater blanket incorporating a uniform resistive grid pattern. Since the blanket is a unitary piece, it is easily and mechanically secured to the lamp envelope. Compensation for the environmental temperature changes along the length of the lamp adjacent to the end filaments is achieved by providing a bifurcated heater control resulting in independent application of heat for the right and left sides of the lamp measured from the center point. Compensation for the increased lamp temperature load caused by the filaments is provided by a separate thermostat located on the heater blanket over the filament zones which is designed to shunt the current and therefore, the heat being applied to the heater blanket adjacent the filament areas in an over temperature condition. Use of a shunt rather than a separately powered heater element allows localized over temperature control of the extreme ends of the heater blanket without a separate or special power source to power the small end segments. The need for a special or separate low voltage power source is then eliminated even though the small heaters at the extreme ends of the lamp are necessarily short and of low resistance in an etched foil resistive heater blanket. According to another aspect of the present invention the heater blanket is first wrapped around a sheet barrier layer such as aluminum which slows thermal transients and prevents excessive localized heating which can otherwise result in delamination and thermal changes to the blanket at power up.

More precisely the invention relates to a fluorescent lamp assembly comprising, in combination, an elongated fluorescent lamp containing an excess of mercury at a cold spot therein, said lamp adapted, when energized by a power source, to emit light radiation through a clear apertured slit, a resistive heater blanket attached to the surface of the lamp, and means for controlling power to said heater blanket so as to maintain a uniform end-to-end temperature distribution of said lamp whether said lamp is in a standby or energized state.

IN THE DRAWINGS

DESCRIPTION OF THE INVENTION

Figure 1:
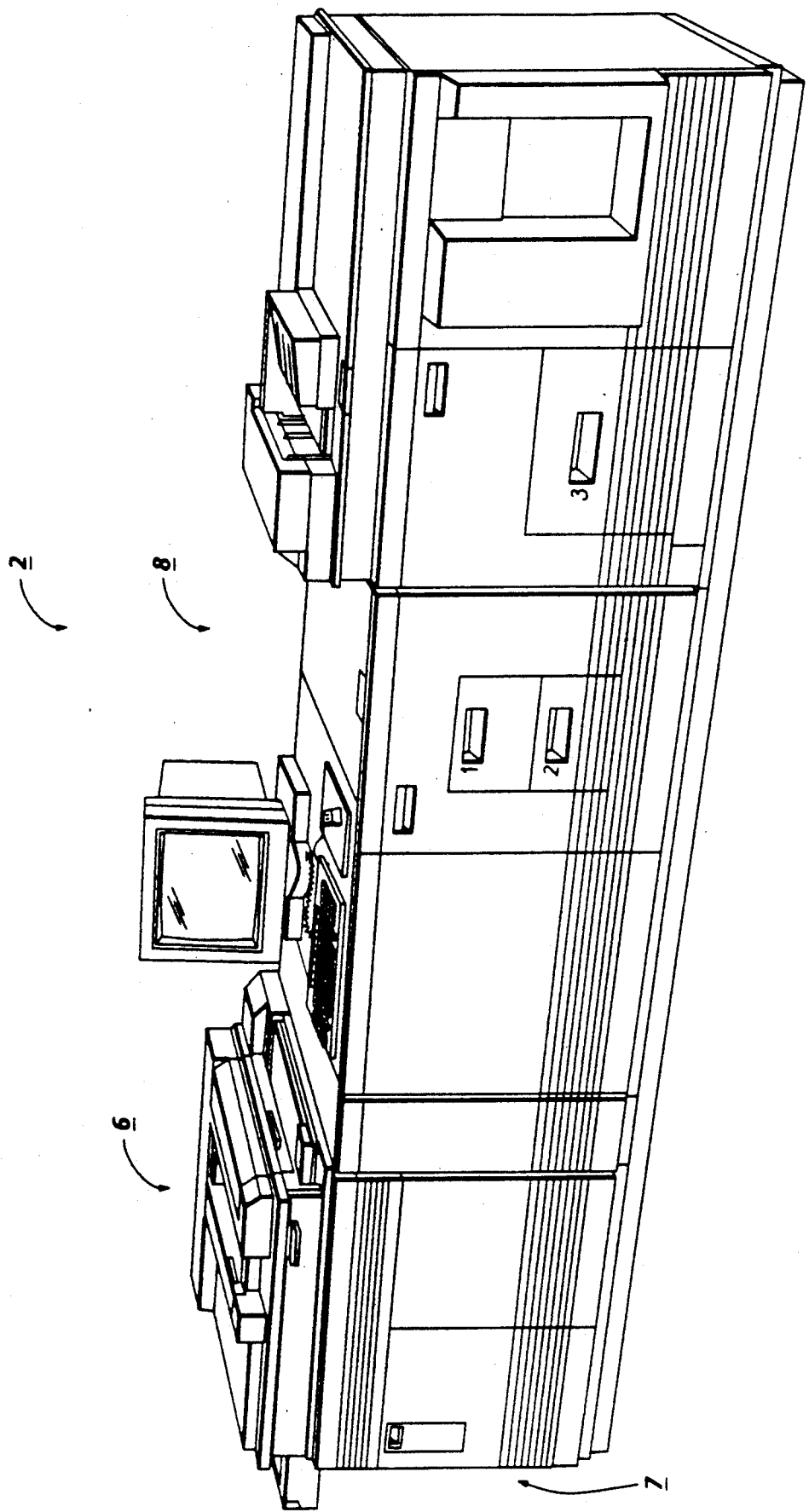
FIG. 1 is a view depicting an electronic printing system having a document scanner section which incorporates the fluorescent lamp assembly of the present invention.
Figure 2:
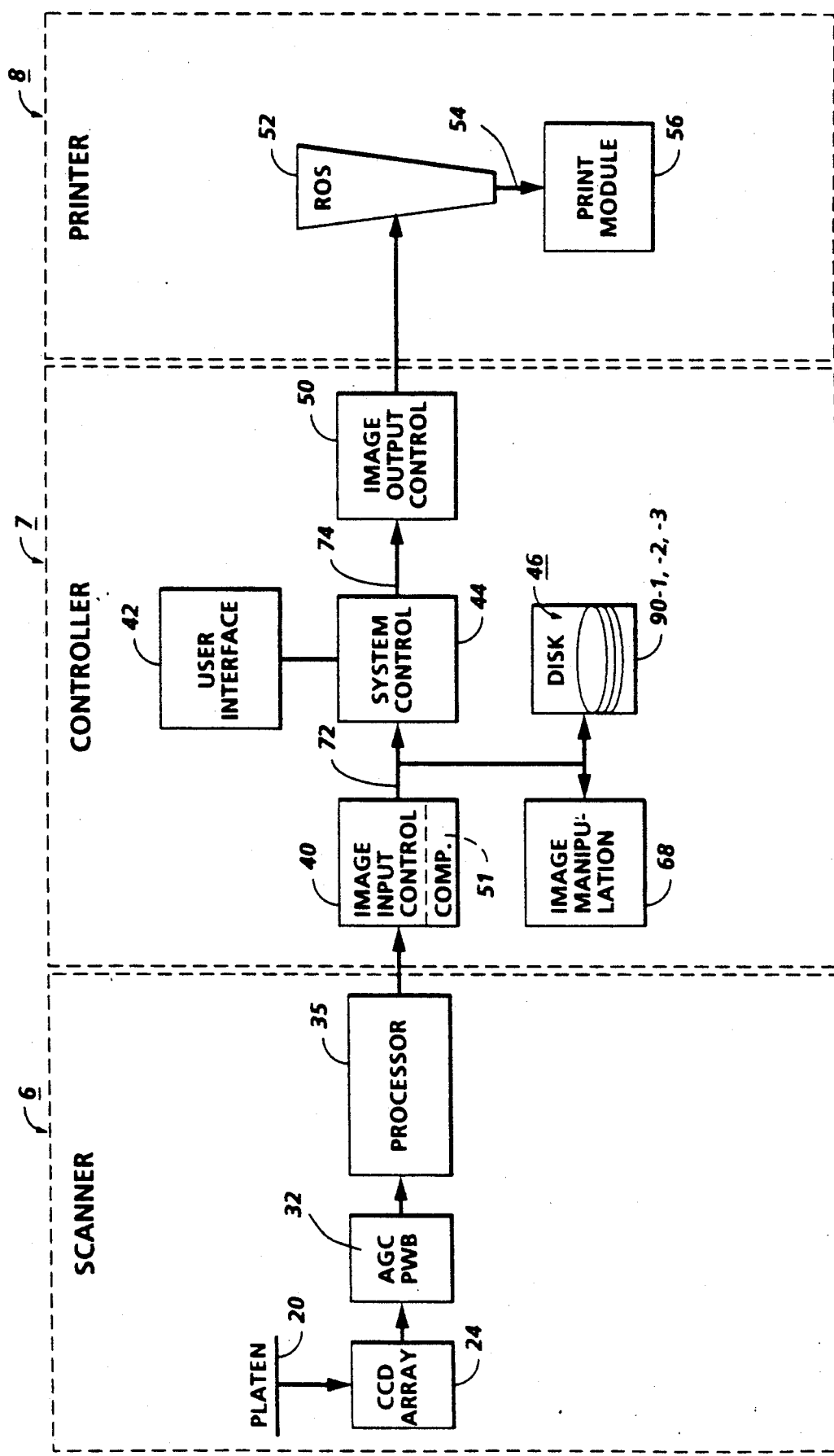
FIG. 2 is a block diagram depicting the major elements of the printing system shown in FIG. 1.

Referring to FIGS. 1 and 2, there is shown an exemplary laser based printing system 2 divided into a scanner section 6, controller section 7, and printer section 8. The fluorescent lamp assembly, including the heater and control circuits to be discussed below, are associated with scanner section 6. While a specific printing system is shown and described, the present invention may be used with other types of printing systems such as light lens copying onto a photoreceptor, ink jet, ionographic, etc.

Figure 3:
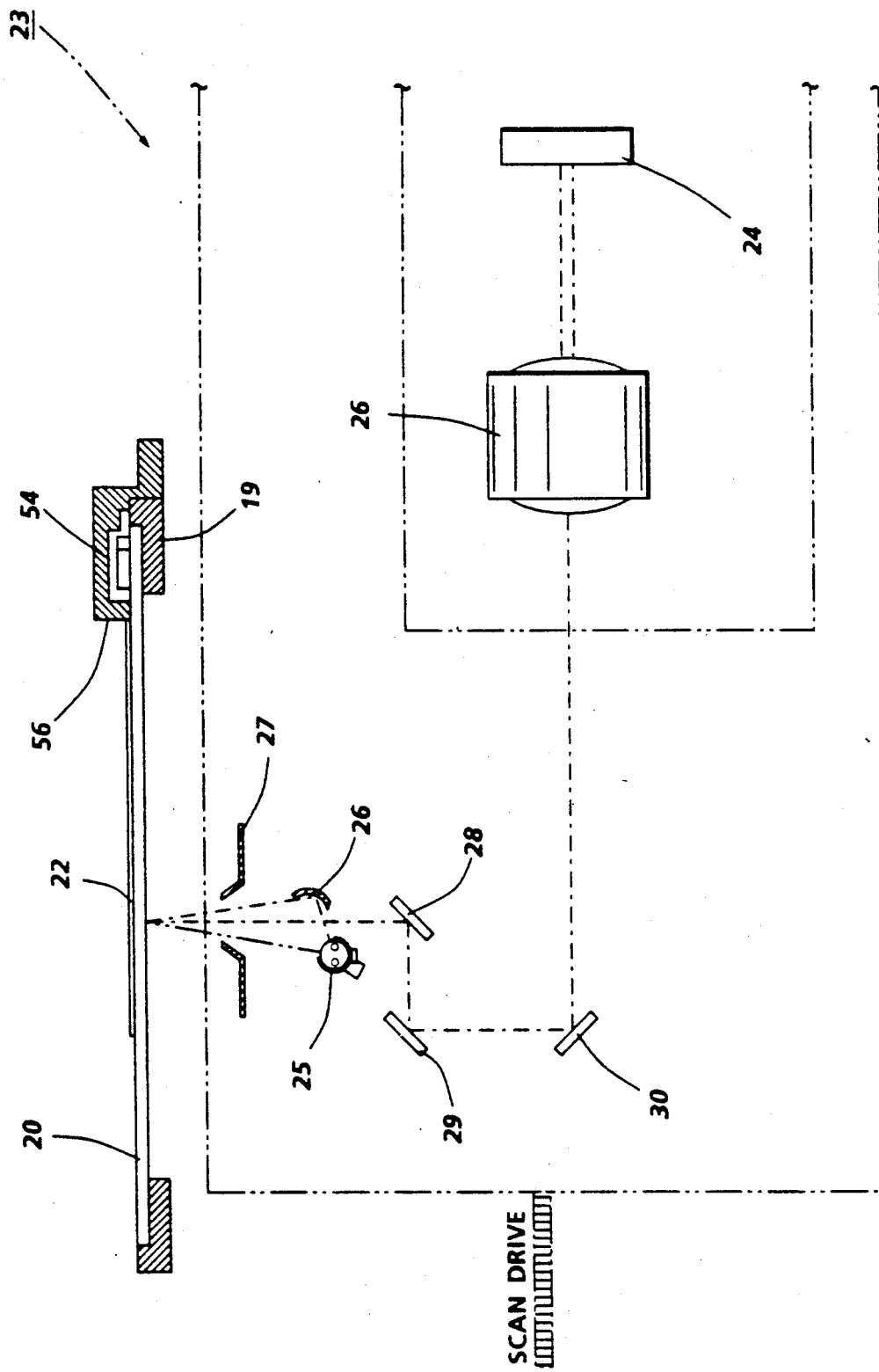
FIG. 3 is an enlarged schematic view of the document scanner for the printing system shown in FIG. 1.

Referring particularly to FIGS. 2 and 3, scanner section 6 incorporates a transparent platen 20 on which a document 22 to be scanned is located. One or more linear arrays 24 are supported for reciprocating scanning movement below platen 20. An optical assembly 23 comprises a plurality of optical components which move together as a single unit. The components include a linear fluorescent lamp assembly 25, with associated reflector 26, and baffle 27 which cooperate to direct a narrow beam of high intensity light emitted from the lamp aperture onto an incremental area of the platen. Also included in assembly 23 are a reduction lens 27, and mirrors 28, 29, and 30, which cooperate to focus the reflected illumination lines from platen 20 and the document being scanned thereon onto array 24. Array 24, which may comprise a two row CCD photo sensor is illuminated by the focused band of illumination and generates image signals or pixels representative of the image scanned which after suitable processing by processor 35, are outputted to controller section 7.

Processor 35 converts the analog image signal outputs of array 24 to digital signals and processes the digital image signals as required to enable system 2 to store and handle the image data in the form required to carry out the job programmed. Processor 35 also provides enhancements and changes to the image signals such as filtering, thresholding, screening, cropping, reduction/enlarging, etc. Referring to FIG. 2, controller section 7 is, for explanation purposes, divided into an image input controller 40. Under interface (UI) 42, system controller 44, main memory 46, image manipulation section, and image output controller 58. The scanned image data input from processor 35 of scanner section 6 is operated on by controller section 7. The output of controller 7 operates a Raster Output Scanner (ROS) 52 in printer 8. ROS 52 has a laser which generates output beams 54 which are in turn scanned across a moving photoreceptor located in print module 56. Image lines are exposed at the photoreceptor with each scan to create a latent electrostatographic image of the document input to modulate at 92. A further, more detailed description of the exemplary printing system 2 is found in co-pending U.S. application No. (D/89289), assigned to the same assignee as the present invention, whose contents are incorporated by reference.

Figure 4:
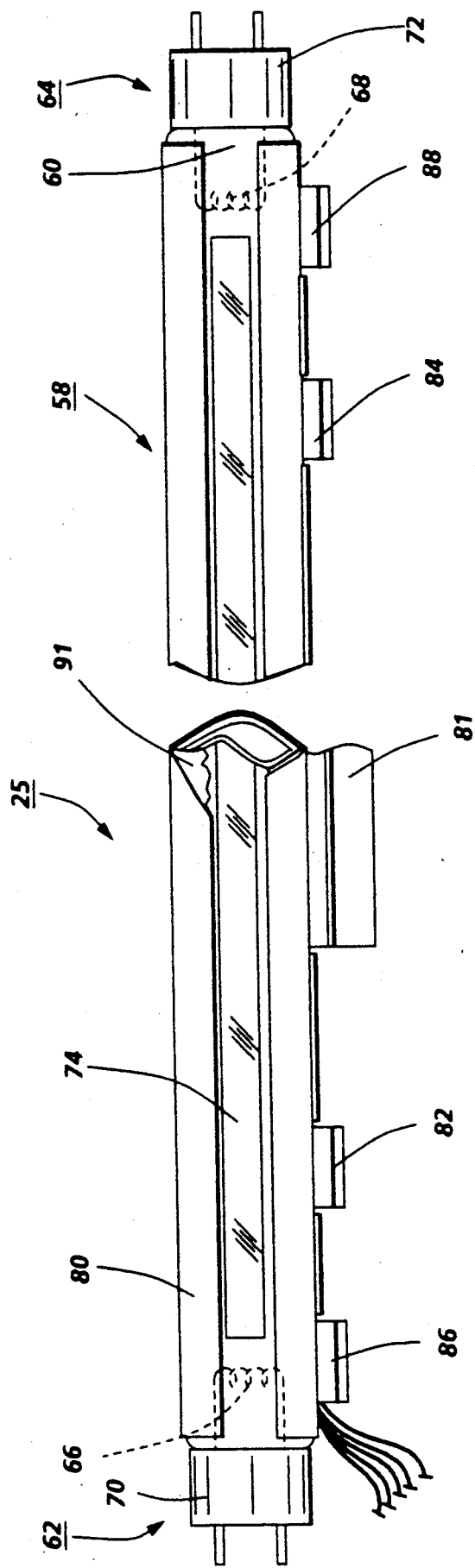
FIG. 4 is a front perspective view of the fluorescent lamp shown in FIG. 3.

In order to obtain the high uniform illumination level to properly detect a document image being scanned at the scanner 24, lamp assembly 25, in a preferred embodiment, a T8, (1" Diameter) EHO lamp which operates with a current of 2 amps and reaches an operating envelope temperature of approximately 300° F. At these relatively high temperatures, the lamp is subject to thermal instabilities along its length resulting, if uncompensated, in unwanted variations in the exposure level at the sensor array 24. Compensation for the instability is provided by attaching a heater blanket to the lamp and attaching a bifurcated electrical input connection to the heater to permit each half of the heater to be independently powered on and off. Referring now to FIG. 4, there is shown illumination lamp assembly 25. The assembly comprises an elongated fluorescent lamp 58 having an envelope 60 with a phosphor layer formed on the inner surface and a quantity of mercury and an inner rare gas sealed within the envelope. Electrodes 62, 64, which include filaments 66, 68 are sealed in ends caps 70, 72. Aperture 74 is provided to permit a band of illumination to be emitted and directed to platen 20 (FIG. 3). According to a first aspect of the present invention, a heater blanket 80 is wrapped around the entire lamp envelope save for the aperture area and a small rectangular cold spot area to which the shoe of a Peltier cooler 81 is attached.

Blanket 80 in a preferred embodiment is a high temperature polyamide impregnated fiberglass structure. A high density resistive grid work pattern is formed within the jacket, in series connection, from one end of the jacket to the other. Central thermostats 82 and 84 are located on the jacket at symmetrical locations distant from the lamp envelope midpoint. Two additional filament control thermostats 86, 88 are located at the ends of the lamp for purposes of separately controlling the heating temperature at the filament end zones as will be seen.

Referring now to FIG. 5 and 6A-6C, heater power is supplied directly from a 208 volt AC line power which is fuse protected and passed to jacket 80 through lamp power supply 90. Operating power to the lamp is provided by illumination ac power supply 90 in response to a lamp turn-on (scan mode) signal. In both standby and run low voltage AC filament power is applied to filament 66,68 from a transformer in the lamp supply. Peltier control circuit 94 incorporates the temperature control (both cooling and heating) and heat exchange components in circuits which are used to maintain the mercury cold spot temperature at the desired value. A cold spot setpoint of 108° F. was found to be optimum for this embodiment.

In the present example, lamp 58 operates continuously with a power input of approximately 152 watts, and draws a two amp current. Lamp outer wall temperature at locations away from the filaments and cold spot during either standby or run are typically in the 300° F. temperature range. Heater power to the blanket is controlled by miniature high precision thermostats 82-88 mounted to the rear surface of the blanket. For the particular mounting geometry used in this enablement, it was empirically determined that 270° F. miniature precision thermostats would maintain the blanket at a temperature above that of the lamp in both standby and run modes.

Figure 5:
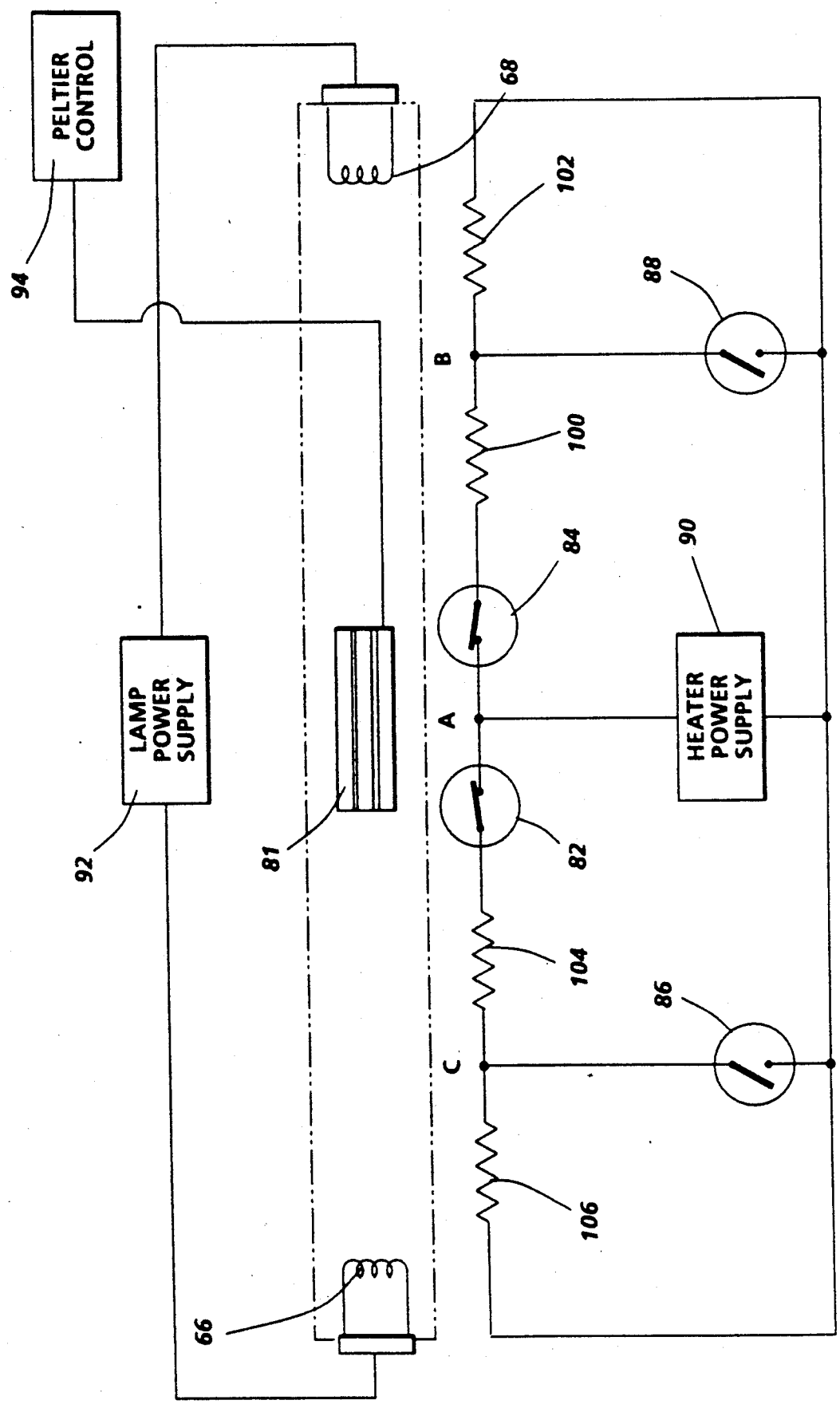
FIG. 5 is an electrical circuit diagram of the power application across the lamp heater blanket.
Figure 6A:
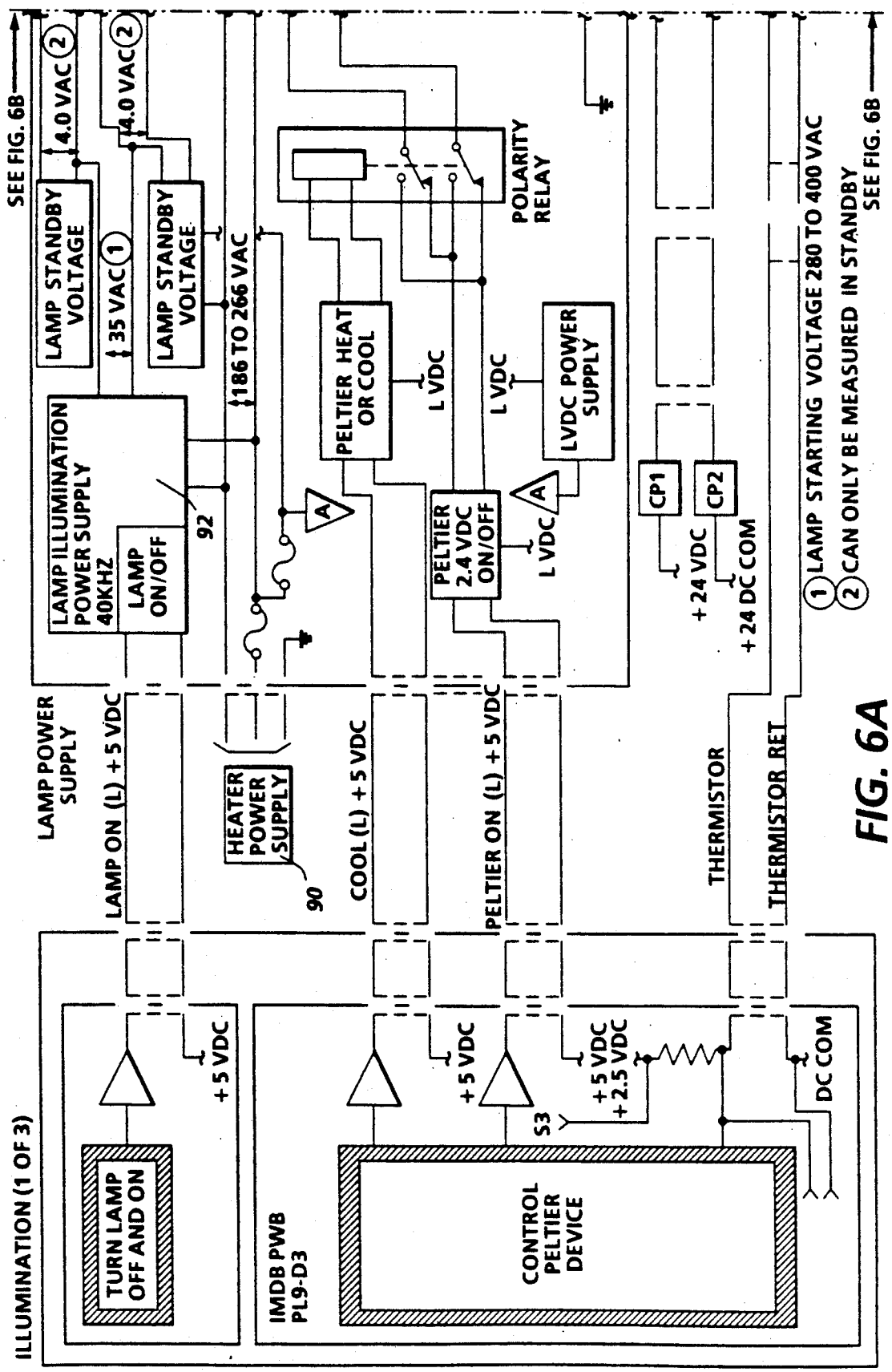
FIGS. 6A, 6B and 6C are wiring diagrams of the lamp power and heater control circuitry.
Figure 6B:
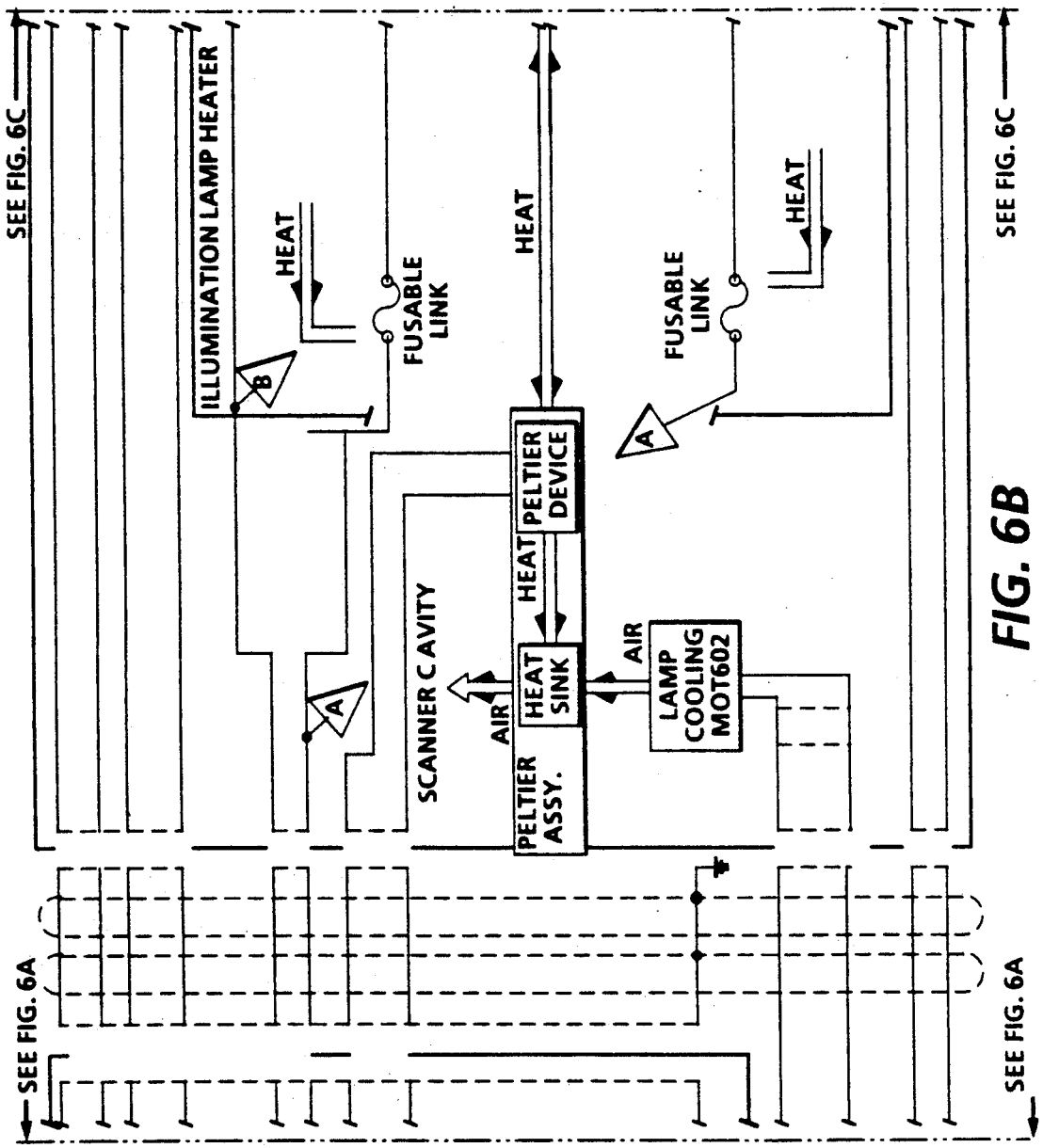
Figure 6C:
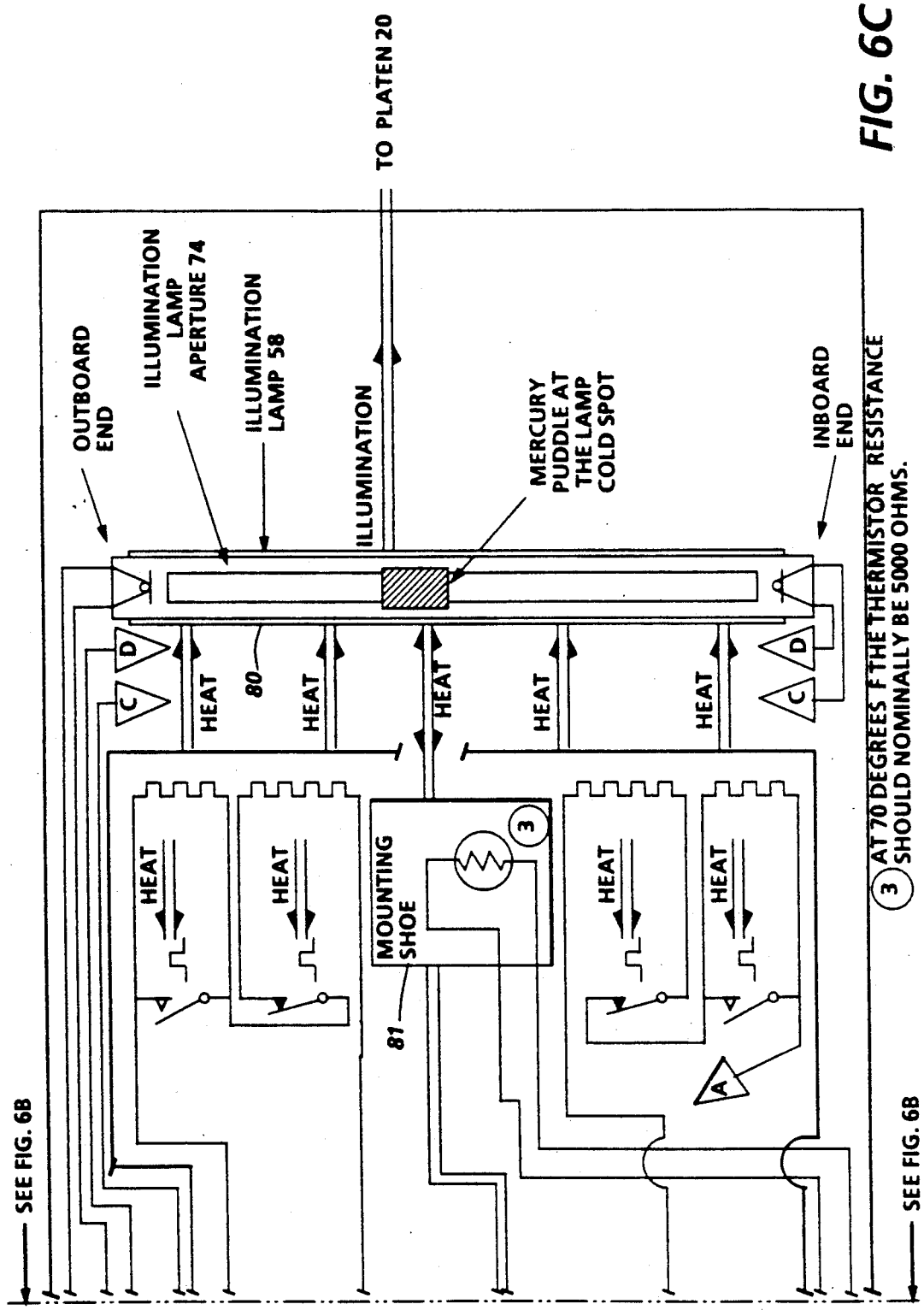

According to a first aspect of the invention, temporal variations in the illumination output of the lamp are reduced by maintaining the temperature of the blanket 80 at a uniform temperature of approximately 300° F. along its entire length in standby and in operation. This is enabled by firstly wrapping the jacket around the entire lamp envelope 60 surface, including the filament areas, but providing independent control of the left and right hand sides of the jacket. Further, each side has a further modification which permits separate control of the heater blanket portion which is adjacent to the filament end areas. Referring again to FIG 5, the resistance of jacket 80 from a midpoint location point A to a right hand location point B is represented by resistor 100. The jacket resistance from point B to the right hand end of the jacket is represented by resistor 102. Similarly, the resistance of jacket 80 from point A to point C is designated as resistor 104, and from point C to the left end of the jacket by resistor 106. Typical values for each set of resistors are 476 and 100 ohms, respectively. Heater power supply 90 is connected across point A and the ends of the lamp. Effectively, as shown in FIG. 5, a bifurcated heater control is enabled. In standby operation thermostats 82,84 are normally closed, and thermostats 86,88 are normally open. Resistors 100-106 are connected in series and power from heater supply 90 causes current to flow through the resistors producing a uniform temperature of 300° F. along the heater blanket length. The blanket is maintained at this relatively high temperature of 300° F. (170° F. is conventional in the art) to prevent mercury/phosphor attachment to interior areas of the envelope other than the cold spot, a phenomenon which occurs when a lamp operating at high envelope temperatures is returned to a relatively low standby temperature.

When the lamp is energized in response to a start scan signal from scanner section 6, the filament zone (areas surrounding filaments 66, 68) immediately become much hotter than the central portion of the lamp envelope reaching possible transient temperatures of 475°. At this temperature, the heater blanket would be damaged by the excess heat supplied by the main portion of the heater blanket during the on portion of the blanket cycle. According to a second aspect of the present invention, thermostats 86, 88, sense the temperature rise at the back of the blanket to be above 270° F. and close, shunting the current in heater sections 102, 106 back into resistors 100 and 104 respectively. The thermostats 82, 84 will open only if the temperature on the back surface of the heater blanket exceeds 270°, and are designed to cycle on and off during both standby and run modes of operation. The net result is that temporal variations in the lamp wall temperature profile along the length of the lamp are minimized while in standby; while fully on or while transitioning from standby to the full condition. The benefits of the dominance of the heater blanket control temperature is the substantial reduction in mercury pressure swings during full on operation and when transitioning from standby to the full on mode. The higher blanket temperature control point needed to prevent the lamp from exceeding the heater blanket control range in run mode also serves to reduce or slow the process of mercury/phosphor attachment at the internal walls of the lamp envelope during standby, leading to a reduction of temperature induced pressure variations during the transient period resulting in an enhancement of the axial illumination profile stability during the transition. The extension of the heater blanket to the extreme ends of the lamp further controls mercury pressure changes by insuring that mercury is not thermally trapped in the end regions of the lamp adjacent to the filaments during prolonged standby in a cold environment. The addition to heat in this zone also reduces the time taken for mercury condensed in these extreme ends of the lamp to be vaporized and migrate back to the cold spot. This rapid end stabilization allows the lamp to be stabilized and ready for use after a relatively short initial warmup period even if the room environment when powered off was relatively cold. This reduces the time a user must wait during the initial power up process.

According to a second aspect of the present invention, a barrier layer 91 is placed between the jacket and the lamp envelope (FIG. 4) to prevent localized heating which can cause delamination or thermal damage to the blanket at lamp energization. According to a still further aspect of the present invention a Teflon TM lubricant is applied between layer 91 and the glass envelope of the lamp. The material prevents inadvertent sticking of the blanket to the lamp by a condensed polyamide from the blanket or contaminations. This provides for easy removal of the blanket from the lamp. While the lamp assembly heater controls of the present invention are especially useful in operating in high illumination applications, they are also suitable for other document scanning functions requiring a temporally stable illumination profile.

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. A fluorescent lamp assembly comprising, in combination, an elongated fluorescent lamp containing an excess of mercury at a cold spot therein, said lamp adapted when energized by a power source to emit light radiation through a clear apertured slit, a heater blanket attached to the surface of the lamp, and, means for controlling power to said heater blanket so as to maintain a uniform end-to-end temperature distribution of said lamp whether lamp is in a standby or energized state.

2. The lamp assembly of claim 1 wherein said heater blanket is electrically and mechanically symmetric about its center with each half functioning independently of the other.

3. The lamp assembly of claim 1 wherein said power controlling means includes a bifurcated input power circuit adapted to independently control application of power to each half of said blanket.

4. The lamp assembly of claim 1 wherein said power input to said blanket causes the blanket to operate a temperature above the operating temperature of the lamp.

5. The lamp assembly of claim 1 or 3 further including circuit means for preventing overheating and damage to the end areas of said heater blanket adjacent to the filaments at the end of said lamp.

6. The fluorescent lamp assembly of claim 3 wherein said bifurcated power control circuit includes a first and second temperature sensing and switching means operatively coupled to each half of said heater blanket, respectively.

7. The fluorescent lamp assembly of claim 6 wherein said first temperature sensing and switching means includes in series a first thermostat connected to said blanket at a location adjacent one end of said lamp, and in the vicinity of the lamp filament, and second thermostat attached to said blanket at a location intermediate the center of the lamp and said thermostat, and wherein said second temperature sensing and switching means includes in series a third thermostat connected to said blanket at a location adjacent the opposite end of the lamp and in the vicinity of the lamp filament, and a fourth thermostat attached to said blanket at a location intermediate the center of the lamp and said third thermostat.

8. The fluorescent lamp of claim 7 wherein said first and third thermostats are normally open during standby operation of the lamp and said second and fourth thermostats are normally closed during said standby operation, all of said thermostats adapted to change state when a preselected temperature, which is above the normal lamp operating temperature, is exceeded.

9. The fluorescent lamp assembly of claim 4 wherein, during said standby operation and run, said heater blanket input power induces a current through said blankets to uniformly heat said blanket to said preselected temperature which is higher than the normal maximum operating temperature of the lamp and the unenergized heater blanket assembly.

10. The fluorescent lamp assembly of claim 8 wherein, during lamp energization, said first and third thermostats sense the higher temperature of the lamp in the vicinity of the lamp filaments and close to shunt out the current from these end sections when the localized temperature exceeds the design limits.

11. The lamp assembly of claim 1 further including an aluminum sheet barrier layer between the heater blanket and the lamp.

12. The lamp assembly of claim 7 further including a Teflon TM lubricant coated between said barrier layer and said glass envelope.

13. The lamp assembly of claim 1 wherein said cold spot is optimized at approximately 108° F. by means of a cooling and heating control assemly located proximate said cold spot.

14. The lamp assembly of claim 4 wherein said preselected lamp enveloped temperature is set at approximately 300° F.

15. In an electrophotographic reproduction device wherein a document in an object plane is scanned in a copy mode by an optical assembly including at least a linear fluorescent lamp and a scanning mirror, the improvement wherein the lamp has a heater blanket attached to its surface and wherein heater input power to the blanket is applied independently to both sides of the blanket so as to maintain the lamp temperature profile at a constant value during both the lamp operational phase as well as standby.

16. An electrophotographic printing machine having a scanning system for illuminating longitudinal sections of incremental width of an original document, and means for exposing a photosensitive medium to the scanned light image, the scanning system including:

an elongated apertured fluorescent lamp having a lamp heater blanket wrapped around the lamp envelope and extending from one end of the lamp to the other, and bifurcated heating control means for independently applying power to each half of said blanket, and thermostat control means associated whit each half of said blanket and adapted to maintain a constant preselected temperature along the blanket length during both lamp standby and lamp energization.

17. The machine of claim 16 wherein said thermostat control means are further adapted to remove power from the ends of the lamp adjacent the lamp filament zones during lamp energization conditions.

* * * * *